United States Patent Office 3,493,587
Patented Feb. 3, 1970

3,493,587
WATER-INSOLUBLE BENZOFURAN-SUBSTITUTED ANTHRAQUINONE DYESTUFFS
Michael Yelland, Manchester, England, assignor to Imperial Chemical Industries Limited, London, England, a corporation of Great Britain
No Drawing. Filed Aug. 23, 1967, Ser. No. 662,596
Claims priority, application Great Britain, Aug. 26, 1966, 38,470/66
Int. Cl. C07d 5/34
U.S. Cl. 260—346.2                       1 Claim

ABSTRACT OF THE DISCLOSURE

1:5 diamino-4:8-dihydroxyanthraquinones which contain in the 2-position a phenyl radical which forms part of a fused oxygen-containing heterocyclic ring system, and the use of the said compounds for colouring synthetic textile materials.

---

This invention relates to new anthraquinone dyestuffs and more particularly it relates to new water-insoluble anthraquinone dyestuffs which are valuable for colouring synthetic textile materials, in particular textile materials comprising cellulose acetate, polyamide, polyacrylonitrile and especially polyester fibres.

According to the invention there are provided the water-insoluble anthraquinone dyestuffs which are represented by the formula:

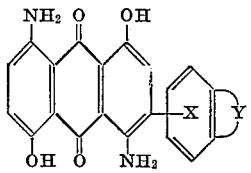

wherein Y represents a divalent radical of the formula:

—O.C($R^1R^2$).$CH_2$—, —O.$CH_2$.$CH_2$.$CH_2$—

—O.$CH_2$.O.$CH_2$— or —O.C($R^1R^2$)$CH_2$.O—, wherein $R^1$ and $R^2$ each independently represent a hydrogen atom or a lower alkyl radical; and the benzene nucleus X, which may be substituted by halogen atoms or methyl or lower alkoxy radicals, is attached to the anthraquinone nucleus through a carbon atom which is in ortho- or para-position to an oxygen atom through which Y is attached to the said benzene nucleus.

Throughout the specification the terms "lower alkyl" and "lower alkoxy" are used to denote alkyl and alkoxy radicals containing from 1 to 4 carbon atoms.

As examples of the lower alkyl radicals represented by $R^1$ and $R^2$ there may be mentioned methyl, ethyl, propyl and butyl radicals. As examples of the lower alkoxy radicals which may be present as substituents on the benzene nucleus X there may be mentioned methoxy, ethoxy, propoxy and butoxy radicals; and as examples of halogen atoms which may be present as substituents on the benzene nucleus X there may be mentioned chlorine and bromine atoms.

According to a further feature of the invention there is provided a process for the manufacture of the anthraquinone dyestuffs, as hereinbefore defined, which comprises reacting a boric acid ester of 1:5-dihydroxy-4:8-dinitroanthraquinone in the presence of sulphuric acid with a compound of the formula

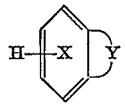

Formula I wherein X and Y have the meanings stated above, provided that in the benzene nucleus X there is no substituent on at least one carbon atom which is in ortho- or para-position to an oxygen atom through which Y is attached to the said benzene nucleus, and subsequently reducing the nitro groups to amino groups.

The process of the invention may be conveniently brought about by adding the 1:5-dihydroxy-4:8-dinitroanthraquinone to a solution of boric acid in sulphuric acid, and stirring the mixture, preferably at a temperature between 20° and 90° C. until formation of the red boric acid ester is complete. The resulting solution is then cooled, the compound added, and the mixture stirred, preferably at a temperature between —20° and +20° C., until the colour has changed completely from red to blue. The sulphuric acid reaction medium is then poured into a mixture of ice and water, the resulting mixture is heated to hydrolyse the boric acid ester, and the precipitated solid is filtered off. The resulting dinitro compound is then treated with a reducing agent, such as sodium sulphide, in a suitable solvent, such as aqueous ethanol, to reduce the nitro groups to amino groups, and the resulting dyestuff is then isolated by conventional methods.

Whilst the resulting dyestuffs consist essentially of the anthraquinone dyestuffs having the formula:

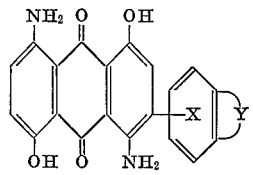

it is usually found that they also contain a minor proportion of 1:5-dihydroxy-4:8-diaminoanthraquinone or of the dyestuffs of the formula

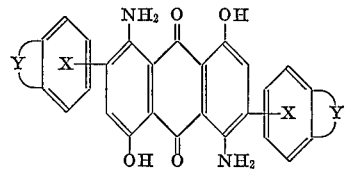

wherein X and Y have the meanings stated, the latter of which are obtained by reaction of two molecular proportions of the compounds of Formula I with the boric acid ester of 1:5-dihydroxy-4:8 dinitro anthraquinone. As it is usually undesirable to have any 1:5-dihydroxy-4:8-diaminoanthraquinone present in the dyestuffs of the invention it can, when necessary, be removed by crystallising the dyestuffs from a suitable organic liquid, for example nitrobenzene.

As examples of the compounds of Formula I there may be mentioned chroman, 2-methyl-2:3-dihydrobenzfuran, 2:3-benz-1:4-dioxan, 2:3-benz-1:5-dioxan, 2:2-dimethyl-2:3 - dihydrobenzfuran, 2:5-dimethyl-2:3 - dihydrobenzfuran, 2:7-dimethyl-2:3-dihydrobenzfuran and 2-methyl-7-chloro-2:3-dihydrobenzfuran.

When a compound of Formula I is used which contains no substituents on the carbon atoms of the benzene nucleus in both ortho- and para-positions to an oxygen atom through which Y is attached to the said benzene nucleus, then it would be expected that the resulting product would be a mixture of compounds due to reaction taking place on either the carbon atom in the para-position or the carbon atom in the ortho-position. However it has in general been found that when starting from such compounds of Formula I only a single product is in fact obtained, and it is believed that in such cases reaction only takes place on the carbon atom which is in para-position to an oxygen atom through which Y is attached to the said benzene nucleus.

The water-insoluble anthraquinone dyestuffs of the invention are valuable for colouring synthetic textile materials, for example cellulose acetate and cellulose triacetate textile materials, polyamide textile materials such as polyhexamethyleneadipamide textile materials, polyacrylonitrile textile materials and preferably aromatic polyester textile materials such as polyethylene terephthalate textile materials. Such textile materials can be in the form of the threads, yarns, or woven or knitted fabric. If desired, the said synthetic textile materials can be in the form of blends with other textile materials, for example blends of polyester textile materials with cellulose or woolen textile materials.

Such textile materials can conveniently be coloured with the water-insoluble anthraquinone dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C. under superatmospheric pressure.

Alternatively the aqueous dispersion of the said anthraquinone dyestuff can be applied to the textile material by a padding or printing process, followed by heating at temperatures up to 230° C. depending on the textile material, or by steaming of the textile material. In such processes it is preferred to incorporate a thickening agent, such as gum tragacanth, gum arabic or sodium alginate, into the aqueous dispersion of the said anthraquinone dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The anthraquinone dyestuffs have excellent affinity and building up properties on synthetic textile materials, and in particular on aromatic polyester textile materials, so enabling deep shades to be obtained. The resulting colorations have excellent fastness to light, to wet treatments, and, in particular, to dry heat treatments such as those carried out at high temperatures during pleating operations.

If desired the anthraquinone dyestuffs of the invention can be applied to synthetic textile materials in conjunction with other disperse dyes, such as are described in, for example, British Specifications Nos. 806,271; 835,819; 840,903; 847,175; 852,396; 852,493; 859,899; 865,328; 872,204; 894,012; 908,656; 909,843; 910,306; 913,856; 919,424; 944,513; 944,722; 953,887; 959,816; 960,235; 961,412; 976,218; 993,162 and 998,858.

The invention is illustrated but not limited by the following examples in which the parts and percentages are by weight.

EXAMPLE 1

33 parts of 1:5-dihydroxy-4:8-dinitroanthraquinone are added to a solution of 50 parts of boric acid in 750 parts of 93% sulphuric acid, and the mixture is stirred for 1 hour at 50° C. The mixture is then cooled to −15° C., 20 parts of chroman are added during 30 minutes, and the mixture is stirred for a further 3 hours at −15° C. The resulting blue mixture is poured into a mixture of 4,000 parts of ice and water, which is then heated for 1 hour at 90° C. The precipitated solid is then filtered off and washed with water. The resulting solid is added to a solution of 160 parts of sodium sulphide in a mixture of 1,000 parts of water and 80 parts of ethanol, which is then heated for 4 hours at 80° C. The mixture is cooled, and the precipitated dyestuff is filtered off, washed with water, then with an aqueous solution of hydrochloric acid and finally with water, and is dried.

The dyestuff consists essentially of the compound of the formula:

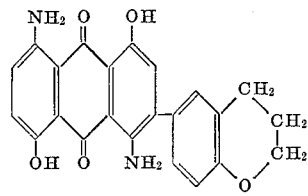

together with a small amount of the compound of the formula:

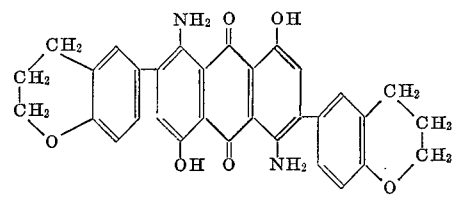

When applied to polyethylene terephthalate textile materials from an aqueous dispersion the dyestuff so obtained yields greenish-blue shades possessing excellent fastness to light and to dry heat treatments.

EXAMPLE 2

In place of the 20 parts of chroman used in Example 1 there are used 24 parts of 2-methyl-2:3-dihydrobenzfuran when a similar dyestuff is obtained.

EXAMPLE 3

In place of the 750 parts of 93% sulphuric acid and 20 parts of chroman used in Example 1 there are used respectively 750 parts of 98% sulphuric acid and 14.8 parts of 2:2-dimethyldihydrobenzofuran whereby a dyestuff is obtained which consists essentially of the compound of the formula:

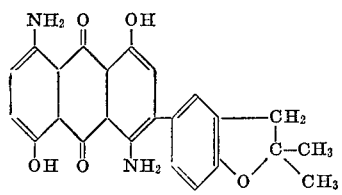

together with a small amount of 1:5-dihydroxy-4:8-diaminoanthraquinone, which can be removed by crystallising the dyestuff from nitrobenzene.

When dispersed in aqueous medium the dyestuff dyes polyethylene terephthalate textile materials in greenish-blue shades possessing excellent fastness to light and to dry heat treatments.

EXAMPLE 4

In place of the 20 parts of chroman used in Example 1 there are used equivalent amounts of each of the following compounds whereby similar dyestuffs are obtained:

2:3-dihydrobenzfuran
2:2:7-trimethyl-2:3-dihydrobenzofuran

2:2:5-trimethyl-2:3-dihydrobenzfuran
2:2:4:7-tetramethyl-2:3-dihydrobenzfuran
2-methyl-7-methoxy-2:3-dihydrobenzfuran
2:2-dimethyl-7-methoxy-2:3-dihydrobenzfuran
2-methyl-7-chloro-2:3-dihydrobenzfuran
1:3-benzodioxan.

I claim:
1. A compound of the formulae

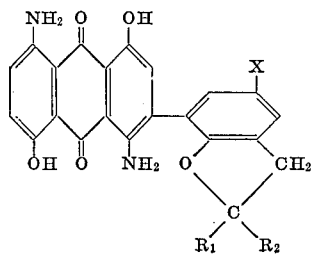

and

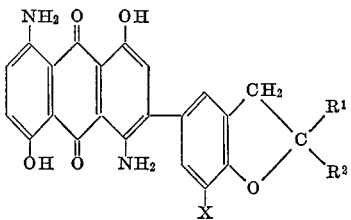

wherein $R_1$ and $R_2$ are independently selected from the class consisting of hydrogen and lower alkyl; and X is a member selected from the group consisting of chlorine, methyl and lower alkoxy.

No references cited.

ALEX MAZEL, Primary Examiner

J. H. TURNIPSEED, Assistant Examiner

U.S. Cl. X.R.

8—21, 24, 39, 40; 260—340.3, 340.5, 345.2